United States Patent
Miyashita et al.

(10) Patent No.: US 11,252,974 B2
(45) Date of Patent: Feb. 22, 2022

(54) OXIDATION INHIBITOR, AND FOOD AND DRINK CONTAINING FATS AND OILS USING SAME

(71) Applicants: NATIONAL UNIVERSITY CORPORATION HOKKAIDO UNIVERSITY, Hokkaido (JP); MEGMILK SNOW BRAND CO., LTD., Hokkaido (JP)

(72) Inventors: Kazuo Miyashita, Hokkaido (JP); Makoto Shiota, Hokkaido (JP); Ai Suzuki, Hokkaido (JP)

(73) Assignees: NATIONAL UNIVERSITY CORPORATION HOKKAIDO UNIVERSITY, Hokkaido (JP); MEGMILK SNOW BRAND CO., LTD., Hokkaido (JP)

( * ) Notice: Subject to any disclaimer, the term of this patent is extended or adjusted under 35 U.S.C. 154(b) by 640 days.

(21) Appl. No.: 15/558,826

(22) PCT Filed: Mar. 17, 2016

(86) PCT No.: PCT/JP2016/058502
§ 371 (c)(1),
(2) Date: Sep. 15, 2017

(87) PCT Pub. No.: WO2016/148238
PCT Pub. Date: Sep. 22, 2016

(65) Prior Publication Data
US 2018/0077946 A1    Mar. 22, 2018

(30) Foreign Application Priority Data
Mar. 19, 2015    (JP) .............................. JP2015-056511

(51) Int. Cl.
A23D 9/00 (2006.01)
C09K 15/22 (2006.01)
(Continued)

(52) U.S. Cl.
CPC .................. *A23D 9/00* (2013.01); *A23L 2/52* (2013.01); *A23L 3/3526* (2013.01);
(Continued)

(58) Field of Classification Search
CPC ....................................................... A23D 9/00
See application file for complete search history.

(56) References Cited

U.S. PATENT DOCUMENTS
2012/0027844 A1    2/2012   Beckman et al.

FOREIGN PATENT DOCUMENTS
EP    2 065 040    6/2009
EP    2343273    * 7/2011    ........... C07C 231/02
(Continued)

OTHER PUBLICATIONS
Chang, et al., The Synthesis and Biological Characterization of a Ceramide Library, vol. 124, No. 9, 2002 9 J. Am. Chem. Soc.*
(Continued)

*Primary Examiner* — Amber R Orlando
*Assistant Examiner* — Philip A Dubois
(74) *Attorney, Agent, or Firm* — Greenblum & Bernstein, P.L.C.

(57) ABSTRACT

An oxidation inhibitor containing, as an active ingredient, an aminocarbonyl compound having a structure resulting from binding of an amino group of a compound having sphingoid base structure and a carbonyl group of a carbonyl compound. The oxidation inhibitor has high oxidation inhibitory effects, and inhibits oxidation of fats and oils, in particular, fats and oils containing a large proportion of polyunsatu-
(Continued)

rated fatty acids to prevent deterioration due to oxidation of fats and oils.

4 Claims, 4 Drawing Sheets

(51) Int. Cl.
  C11B 5/00      (2006.01)
  A23L 3/3526    (2006.01)
  A23L 33/115    (2016.01)
  A23L 2/52      (2006.01)
  C09K 15/20     (2006.01)

(52) U.S. Cl.
  CPC .......... A23L 33/115 (2016.08); C09K 15/20 (2013.01); C09K 15/22 (2013.01); C11B 5/00 (2013.01); C11B 5/005 (2013.01); A23V 2002/00 (2013.01)

(56) References Cited

FOREIGN PATENT DOCUMENTS

| | | |
|---|---|---|
| EP | 2 796 444 | 10/2014 |
| JP | 5-320048 | 12/1993 |
| JP | 8-259988 | 10/1996 |
| JP | 2013-147636 | 8/2013 |
| WO | 01/42390 | 6/2001 |

OTHER PUBLICATIONS

Takamatsu et al., "Imino [4+4] cycloaddition products as exclusive and biologically relevent acrolein-amine conjugates are intermediates of 3-formyl-3,4-dehydropiperidine (FDP), an acrolein biomarker", Bioorganic & Medicinal Chemistry, vol. 22, No. 22, pp. 6380-6386, (2014).

Chang et al., "The synthesis and biological characterization of a ceramide library", Journal of the American Chemical Society, vol. 124, No. 9, pp. 1856-1857 and S1-S8 (2002).

Goldstein et al., "Formation of high-axial-ratio-microstructures from natural and synthetic sphingolipids", Chemistry and Physics of Lipids, vol. 88, No. 1, pp. 21-36, (1997).

Shimajiri et al., "Synergistic antioxidant activity of milk sphingomyeline and its sphingoid base with α-tocopherol on fish oil triacylglycerol", Journal of Agricultural and Food Chemistry, vol. 61, No. 33, pp. 7969-7975, (2013).

Extended European Search Report for EP Patent Application No. 16765067.0, dated Aug. 1, 2018.

International Search Report issued in PCT/JP2016/058502, dated Apr. 26, 2016.

International Preliminary Report on Patentability issued in PCT/JP2016/058502, dated Sep. 19, 2017.

Notice of Refusal Office Action issued by Taiwan Intellectual Property Office with regard to the corresponding Taiwan application No. 105108389, dated Mar. 27, 2020, English translation.

Office Action in corresponding TW Application No. 105108389, dated Dec. 11, 2019 (with English machine translation).

Sun, "Research and Development of Natural Ceramide," China Oils, 2003, vol. 28, No. 2, pp. 60-61 (with English abstract).

Yun-feng et al., "Application and Function of Ceramide," Grain and Oil, 2005, pp. 14-16 (with English abstract).

Office Action issued in corresponding EP App. No. 16765067.0, dated Feb. 24, 2021.

* cited by examiner

OXIDATION INHIBITOR, AND FOOD AND DRINK CONTAINING FATS AND OILS USING SAME

TECHNICAL FIELD

The present invention relates to an oxidation inhibitor, in particular, an oxidation inhibitor containing, as an active ingredient, a compound resulting from binding of a sphingoid and a carbonyl compound, for example, aldehyde, fat and oil containing the oxidation inhibitor, and a food product containing the fat and oil.

BACKGROUND ART

Natural fats and oils, such as animal fats (e.g. lard or beef tallow), marine oil and vegetable oils, have been widely used in the food product field.

Essential fatty acids (e.g., linoleic acid, linolenic acid, arachidonic acid, eicosapentaenoic acid and docosahexaenoic acid) are the fatty acids being component of fats and oils and are unsaturated fatty acids having a double bond or double bonds. Essential fatty acids are metabolized in organisms, and converted to compounds, such as prostaglandin, to play important roles in homeostasis and maintenance of function of organism.

In recent years, studies on unsaturated fatty acids, in particular, polyunsaturated fatty acids having two or more double bonds have revealed the effectiveness of n-3 or n-6 essential fatty acids, such as linoleic acid, α-linolenic acid, γ-linolenic acid, arachidonic acid, eicosapentaenoic acid, and docosahexaenoic acid. A large number of and a large amount of fats and oils have been provided that contain these unsaturated fatty acids, for example, vegetable oils such as soybean oil or safflower oil, marine oil, or food products containing these oils.

It has been indicated that unsaturated fatty acids are oxidized by oxygen in air or oxygen dissolved in solution to generate undesirable peroxide. In particular, trace amounts of metal (e.g., iron or copper) or ascorbic acid containing in fats and oils or food products or photochemical reaction accelerate oxidation reaction. Thus, it may be difficult to inhibit quality loss, for example, decay, coloring and reduction of flavor such as reversion flavor resulting from oxidation of fats and oils or food products containing fats and oils even by replacement with nitrogen gas.

Oxidation of food components are generally prevented by addition of oxidation inhibitors, for example, tocopherol, sorbic acid, soybean phosphatide (phospholipid), dibutylhydroxytoluene (BHT), butylhydroxyanisol (BHA). Unfortunately, a large amount of oxidation inhibitor is required to prevent oxidation of unsaturated fatty acid.

Aminocarbonyl compounds prepared by aminocarbonyl reaction of an amino acid with a carbohydrate are known to be effective to inhibit oxidation, such as autoxidation and thermal oxidation. Unfortunately, such aminocarbonyl compounds are generally highly polar and hydrophilic, thus are inadequate for oxidation inhibitors of fats and oils.

Patent Literature 1 discloses an oxidation inhibitor containing dihydroxy sphingosine as an active ingredient. However, coexistence of dihydroxy sphingosine and α-tocopherol is required to achieve full potential of such oxidation inhibitor.

RELATED ART

Patent Document 1: Japanese Unexamined Patent Application Publication No. 2013-147636

SUMMARY OF INVENTION

It is an object of the present invention to provide a novel oxidation inhibitor having high activity of oxidation inhibitory and preventing oxidation of unsaturated fatty acids, in particular polyunsaturated fatty acids.

Solution to Problem

The present inventors have found that an aminocarbonyl compound resulting from binding of an amino group of a sphingoid and a carbonyl group of a carbonyl compound has significantly high activity of oxidation inhibitory to achieve above mentioned objective and have accomplished the present invention based on the following aspects:

(1) An oxidation inhibitor containing, as an active ingredient, an aminocarbonyl compound having a structure resulting from binding of an amino group of a compound having sphingoid base structure and a carbonyl group of a carbonyl compound.

(2) The oxidation inhibitor of Aspect (1), wherein the carbonyl compound is at least one compound selected from the group consisting of aldehydes, ketones, esters, and fatty acids.

(3) The oxidation inhibitor of Aspect (1), wherein the carbonyl compound is at least one compound selected from group consisting of propanal, propenal (acrolein), 2-hexenal, 3-hexenal, 2-pentenal, 2,4,7-decatrienal, 2-butenal, 2-butylfuran, acetaldehyde, 4,5-epoxy-2-heptanal, butanal, methyl octanoate, methyl 9-oxononanoate, 3,6-nonadienal, 2,4-heptadienal, hexanal, 2-heptenal, heptanal, nonanal, pentanal, and octanal.

(4) The oxidation inhibitor of Aspect (1), wherein the carbonyl compound is at least one compound selected from group consisting of 2-propanone, 2-butanone, 2-pentanone, 2-hexanone, 2-heptanone, 2-octanone, 2-nonanone, and 3-octene-2-one.

(5) The oxidation inhibitor of (1), wherein the carbonyl compound is at least one compound selected from the group consisting of methyl 10-oxo-8-decenoate, methyl heptanoate, methyl 10-oxodecanoate, methyl nonanoate, methyl 8-oxooctanoate, methyl octanoate, methyl 9-oxo nonanoate, methyl furanoctanoate, 2,4-octadiene-2-one, methyl 13-oxo-9,11-tridecanedienoate, heptanoic acid, octanoic acid, and nonanoic acid.

(6) The oxidation inhibitor of any one of Aspects (1) to (5), wherein the compound having sphingoid base structure is at least one compound selected from the group consisting of dihydrosphingosine, sphingosine, N,N-dimethylsphingosine, phytosphingosine, 4-sphingenine, 8-sphingenine, 4-hydroxy-8-sphingenine, 4,8-sphingadienine, 9-methyl-4,8-sphingadienine, 4,8,10-sphingatrienine, and 9-methyl-4,8,10-sphingatrienine.

(7) Fat and oil containing the oxidation inhibitor of any one of Aspects (1) to (6).

(8) Fat and oil of Aspect (7), wherein the oxidation inhibitor is compounded in an amount of 1 ppt or more.

(9) Drink and food containing the fat and oil of Aspects (7) or (8).

Effects of Invention

Oxidation inhibitors of the present invention have high oxidation inhibitory effects, and inhibit oxidation of fats and oils, in particular, fats and oils containing a large proportion of polyunsaturated fatty acids to prevent deterioration due to oxidation of fats and oils. Furthermore, the oxidation inhibitors of the present invention are also applicable to food components other than fats and oils.

DESCRIPTION OF EMBODIMENTS

The present invention relates to an oxidation inhibitor containing, as an active ingredient, an aminocarbonyl compound having a structure resulting from binding of an amino group of a compound having sphingoid base structure and a carbonyl group of a carbonyl compound.

Figure 1A:
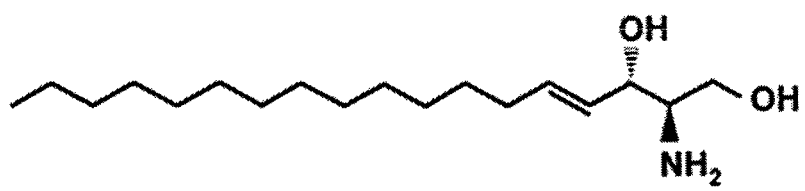
FIGS. 1A and 1B illustrate chemical structures of sphingosine and dihydrosphingosine, respectively.
Figure 1B:
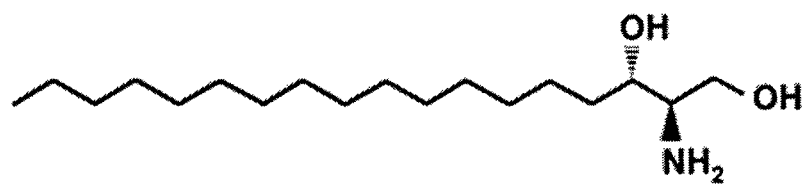

Typical compounds having sphingoid base in the present invention may be a sphingoid, a type of long chain aminoalcohol. Examples of the sphingoids applicable to the present invention include dihydrosphingosine, sphingosine, N,N-dimethylsphingosine, phytosphingosine, 4-sphingenine, 8-sphingenine, 4-hydroxy-8-sphingenine, 4,8-sphingadienine, 9-methyl-4,8-sphingadienine, 4,8,10-sphingatrienine and 9-methyl-4,8,10-sphingatrienine. The sphingoid base structure may have any number of double bonds at any position. FIGS. 1A and 1B illustrate chemical structures of typical compounds having sphingoid bases. FIGS. 1A and 1B illustrate the structures of sphingosine and dihydrosphingosine, respectively.

Sphingoids can be prepared by hydrolysis of sphingolipid containing a sphingoid base. Sphingolipids occur widely in animals or plants and have a common structure of ceramide resulting from acid-amide binding of a sphingoid base as a long chain base component and fatty acid, and also have a structure wherein sugar or phosphoric acid and base is bound to. The compound bound with a sugar in glycosidic bond is referred to as glycosphingolipid, and the compound bound with phosphoric acid and base is referred to as sphingophospholipid.

The compound having a sphingoid base structure in the present invention is prepared from sphingolipid obtained from plants, such as grain and beans, milk, cattle brains, and microorganisms. For example, dihydro sphingosine can be prepared by hydrolysis of sphingomyelin (sphingophospholipid in milk), or lactosylceramide or glucosilceramide (glycosphingolipid in milk).

The carbonyl compound of the present invention has a carbonyl group reactable with an amino group of a compound having a sphingoid base structure. Examples of the carbonyl compound include aldehydes, ketones, esters, and fatty acids.

Examples of aldehydes include propanal, propenal (acrolein), 2-hexenal, 3-hexenal, 2-pentenal, 2,4,7-decatrienal, 2-butenal, acetaldehyde, 4,5-epoxy-2-heptanal, butanal, 3,6-nonadienal, 2,4-heptadienal, hexanal, 2-heptenal, heptanal, nonanal, pentanal, and octanal.

Examples of ketones include 2-propanone, 2-butanone, 2-pentanone, 2-hexanone, 2-heptanone, 2-octanone, 2-nonanone, 3-octene-2-one, and 2,4-octadiene-2-one.

Examples of esters include methyl 10-oxo-8-decenoate, methyl heptanoate, methyl 10-oxodecanoate, methyl nonanoate, methyl 8-oxooctanoate, methyl octanoate, methyl 9-oxo nonanoate, methyl furanoctanoate, and methyl 13-oxo-9,11-tridecanedienoate.

Examples of fatty acids include hexanoic acid, heptanoic acid, octanoic acid, and nonanoic acid.

Particularly preferred carbonyl compound in the present invention are propanal and propenal (acrolein).

The oxidation inhibitor of the present invention can be prepared by aminocarbonyl reaction of one of the above mentioned compounds having a sphingoid base structure with a compound having a carbonyl group reactable with the amino group in the base.

Figure 2A:
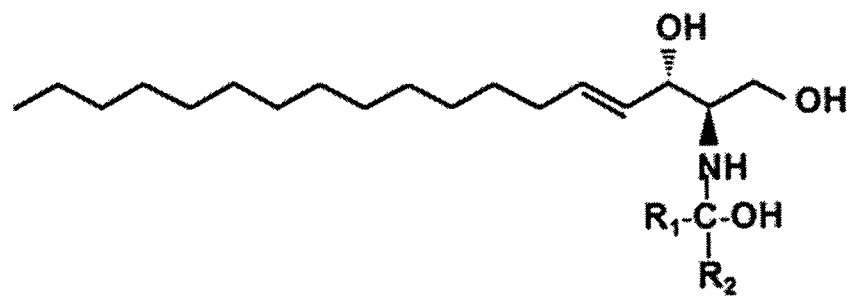
FIG. 2A illustrates a compound resulting from a covalently binding amino group of a sphingoid base and carbonyl carbon of a carbonyl compound and reduction of the carbonyl oxygen to a hydroxyl group.
Figure 2B:
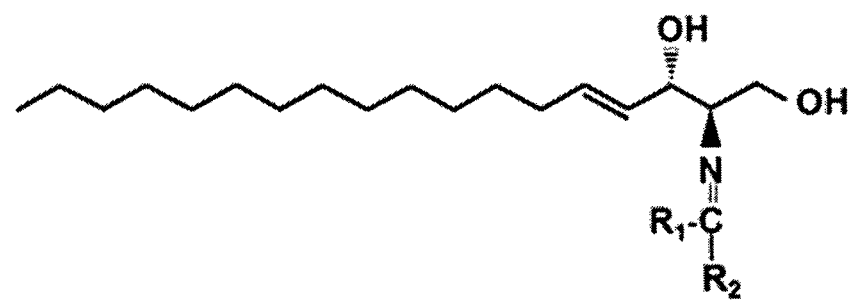
FIG. 2B illustrates a compound resulting from elimination of the hydroxyl group in the form of water from carbonyl oxygen together with hydrogen from the amino group of FIG. 2A.
Figure 2C:
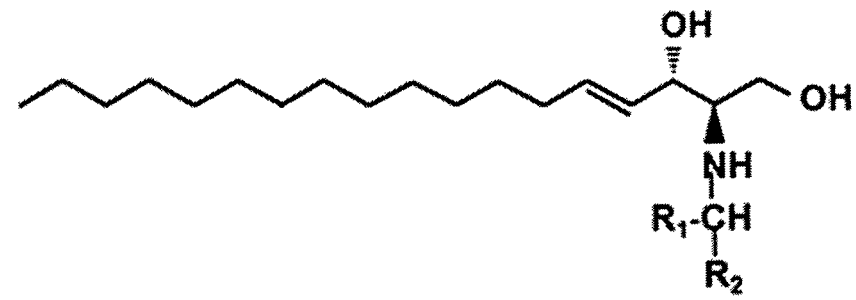
FIG. 2C illustrates a compound resulting from reduction of the double bond of FIG. 2B.

FIGS. 2A to 2C illustrate chemical structures of aminocarbonyl compounds resulting from binding of a sphingosine (compound having a sphingoid base structure) and a carbonyl compound ($R_1$—CO—$R_2$) as an exemplary chemical structure of the oxidation inhibitor of the present invention.

The aminocarbonyl reaction in the present invention can be carried out under general conditions. For example, a compound having a sphingoid base structure and a compound having a carbonyl group are mixed in a suitable solvent in an approximately equivalent molar ratio, followed by allowing to stand at normal pressure and a temperature of 60° C. to 120° C. for 10 min. to 2 hr. Reaction products can be separated and purified by column chromatography or any other general method.

Oxidation inhibitors of the present invention categorized into aminocarbonyl compounds have inhibitory effects for oxidation reaction, such as autoxidation or thermal oxidation, which aminocarbonyl compounds have. Furthermore, oxidation inhibitors of the present invention have long chains that are oil-soluble, and thus are useful for antioxidation for fats and oils, unlike conventional aminocarbonyl compounds.

Addition of oxidation inhibitors of the present invention to fats and oils can inhibit oxidation thereof. It is particularly preferred that oxidation inhibitors of the present invention be added to liquefied fats and oils at normal temperature or at or above the melting point and be dispersed in the fats and oils.

Although the amount of oxidation inhibitor of the present invention can be appropriately modified depending on a food containing fats and oils, an oxidation inhibitor is preferably contained in an amount of 1 ppt or more of the fats and oils. The amount of less than 1 ppt may reduce the oxidation inhibitory effect. An increased amount of addition results in higher oxidation inhibitory effect if oxidation inhibitory effect was intended.

The oxidation inhibitors of the present invention can be also added to drink and food other than fats and oils. Any methods for addition to drink and food can be used. For example, the oxidation inhibitors of the present invention may be dissolved or suspended in deionized water and then the solution or suspension may be added to drink and food.

The mixture is agitated and then formulated into an appropriate form. Any mixing condition can be used for homogeneous mixing of the oxidation inhibitors of the present invention. For example, Ultra Disperser (available from IKA Japan) or TK Homomixer (available from PRIMIX Corporation) can be used. The solution containing the oxidation inhibitors of the present invention may be optionally concentrated with a reverse osmosis membrane (RO membrane) or freeze-dried for convenience of usage as drink and food feedstock. The oxidation inhibitors of the present invention can be sterilized by any treating process generally used for production of drug, drink and food, and forage. Dry heat sterilization can also be used for powdery oxidation inhibitor. Thus, the oxidation inhibitors of the present invention can be applied to production of drug, drink and food or forage in various forms, such as liquid, gel, powder, and granules.

Addition of the oxidation inhibitors of the present invention to fats and oil, in particular, fats and oil containing polyunsaturated fatty acids, or food products containing these fats and oil can inhibit reversion flavor or maintain taste of food product. Long-term suppression of taste reduction may result in extension of the expiration dates of fats and oils and food products containing the oxidation inhibitor. The oxidation inhibitors of the present invention can be used in combination with a conventional oil-soluble oxidation inhibitor (e.g., β-carotene) to achieve synergistic effect.

Fat and oil containing the oxidation inhibitors of the present invention can be used alone as edible fats and oils, and also be used as feedstocks of food products, for example, oily food products such as margarine and spread, salad dressing, cookie, butter cake, formula milk such as nursing powder milk or coffee cream, and cream such as whipped cream. Food products containing fats and oils containing the oxidation inhibitors of the present invention as a feedstock can inhibit oxidation during storage, and prevent an increase in peroxide value (hereinafter also referred to as POV), incidence of oxidation odor and the like.

Use of fats and oils containing the oxidation inhibitors of the present invention as oil for flying, for example, tempura, potato chips, donuts, Kakiage and fly causes less degradation even for long-term use. Fats and oils containing the oxidation inhibitors of the present invention is suitable for commercial use for production of a large amount of flying food products. Oils containing a relatively small amount of polyunsaturated fatty acid such as palm oil are usually used as oils for flying to avoid oxidation of the oils. Use of the oxidation inhibitors of the present invention enables oils containing a large amount of polyunsaturated fatty acid, for example, soybean oil and canola oil to be used for flying. Furthermore, the oxidation of fried food prepared using fats and oils containing the oxidation inhibitors of the present invention is also inhibited.

The following examples and experiments further describe the invention, but should not be construed to limit the scope of the invention in any way.

EXAMPLE

Example 1

Sphingosine and propanal were dissolved in a phosphate buffer and heated at 100° C. for one hour. The compound resulting from binding the amino group of sphingosine and the carbonyl group of propanal was confirmed by liquid chromatography/mass spectrometry (hereinafter also referred to as LC/MS). The product was purified by silica gel column chromatography to give an oxidation inhibitor of Example 1 (Example compound 1) at a purity of 95%.

Example 2

Butter serum powder was immersed in ethanol overnight, and then the mixture was filtrated with suction to collect the filtrate. Extraction was repeated by immersion of the residue in ethanol overnight. The filtrate was concentrated, was added to chloroform/methanol/water (10:5:3, v/v/v), and was subjected to liquid-liquid distribution overnight. The lower chloroform phase was collected and concentrated. The solvent was completely evaporated to give butter serum lipid.

Then, neutral lipid was removed and polar lipid was isolated from the butter serum lipid by liquid-liquid distribution and solvent extraction. A large amount of diethyl ether was added to the polar lipid fraction, and allow to stand at −20° C. overnight. The mixture was filtrated to collect the filtrate. The filtrate was concentrated and the solvent was completely evaporated to give sphingolipid fraction.

A large amount of pyridine was added to the sphingolipid fraction, and the mixture was allowed to stand at −20° C. overnight. The mixture was then filtrated to collect the filtrate. The filtrate was concentrated and the solvent was completely evaporated to give sphingomyelin (SPM) fraction. The resulting SPM was hydrolyzed with hydrochloric acid. The hydrolyzate was purified by silica gel column chromatography to give dihydrosphingosine at a high purity of 99%.

Dihydrosphingosine and 2-pentenal were dissolved in phosphate buffer and the solution was heated at 100° C. for one hour. The compound resulting from binding the amino group of dihydrosphingosine and the carbonyl group of 2-pentenal was confirmed by liquid chromatography/mass spectrometry (hereinafter also referred to as LC/MS). The product was purified by silica gel column chromatography to give an oxidation inhibitor of Example 2 (Example compound 2) at a purity of 90%.

[Experiment 1]

The oxidation inhibitory effect of the oxidation inhibitor prepared in Examples 1 and 2 was evaluated by an oxidation test. Example compound 1, Example compound 2, and α-tocopherol as a comparative oxidation inhibitor (1 mg for each) were each mixed with marine oil triglyceride (hereinafter also referred to as marine oil TG) (99 mg) for analytical sample. Marine oil TG (100 mg) was also used as a comparative sample without oxidation inhibitor.

Figure 3:
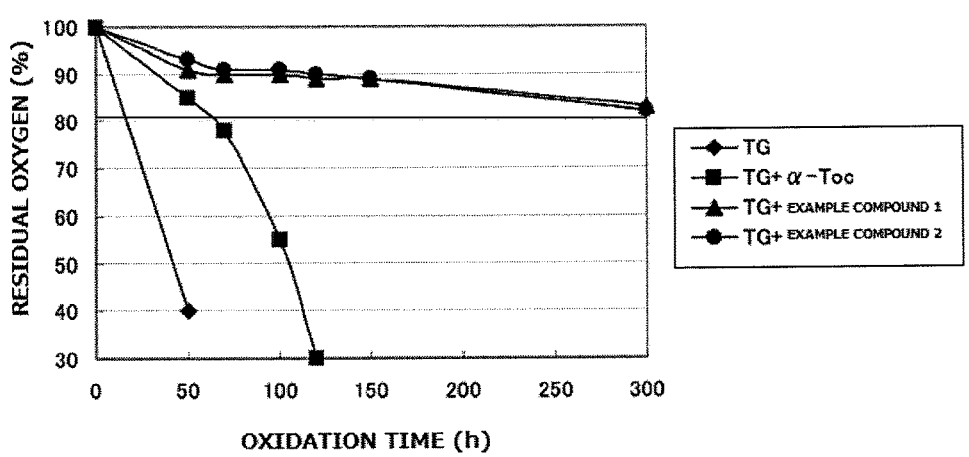
FIG. 3 is a graph of time-dependent oxygen absorption with an oxidation inhibitor of the present invention.

An analytical sample was weighed precisely into an analytical vial (5 mL) and capped with a butyl septum rubber and aluminum vial seal. The sample was incubated at 40° C. in the dark. The head space air (40 μL) in the vial was sampled at every regular interval and injected to a gas chromatograph (GC) equipped with a thermal conductivity detector (TCD). The peak of oxygen decreased with oxidation. The oxygen absorption due to oxidation of lipid was calculated from the change of peak ratio of oxygen to nitrogen. FIG. 3 illustrates a change in the averaged observed value. The longitudinal and horizontal axes represent the residual oxygen (%) and the oxidation time (hour), respectively. The fatty acid composition of marine oil TG used in the experiment and analytical conditions were as follows.

TABLE 1

| Composition of fatty acid of glyceride in marine oil (wt %) | |
| --- | --- |
| 14:0 | 6.7 |
| 16:0 | 7.9 |
| 16:1n-7 | 12.3 |
| 18:2n-6 | 1.4 |
| 20:0 | 3.8 |
| 20:5n-3 | 25.1 |
| 22:5n-3 | 2.2 |
| 22:6n-3 | 9.2 |

[GC Condition]
Apparatus: Shimazu GC-14B gas chromatograph [Shimadzu Corporation]
Integrator: Shimazu C-R8A chromatography workstation [Shimadzu Corporation]
Preamplifier: AMP-7B [Shimadzu Corporation]
Detector: TCD
Column: Molecular sieves-5A (60/80 mesh; 3 m)
Column temperature: 50° C.
Injection port temperature: 100° C.
Detector temperature: 100° C.
Carrier gas: helium gas
Helium gas pressure: 50 kPa Marine oil TG contains a large amount of polyunsaturated fatty acid such as 20:5n-3(EPA) and 22:6n-3(DHA) (Table 1) and may be easily oxidized. Thus, most of the oxygen in the vial was consumed after 50 hr from the start of the measurement. Marine oil TG containing Example product 1 or Example product 2 showed an obviously slower oxygen absorption rate than that of oil TG without inhibitor (only marine oil TG). In this case, most of the oxygen remained even after 300 hr. In contrast, the oxygen absorption of marine oil TG containing α-tocopherol was slower than that of marine oil TG without inhibitor, but faster than that of marine oil TG containing Example product 1 or Example product 2. These results show that marine oil TG in Example product 1 or Example product 2 has high oxidation inhibitory effect.

Example 3

Aqueous whey protein concentrate (WPC) solution (10%) was treated with protease. The resulting solution was extracted with chloroform-methanol (2:1) solution. The extract was concentrated and then extracted with acetone to give a phosphatide (phospholipid) fraction. The phosphatide (phospholipid) fraction was extracted stepwise with chloroform-methanol solution by silica gel chromatography. The extract was freeze-dried to give purified sphingomyelin. The purified sample was fractionated with thin layer chromatography, and the content was determined with a densitometer after color developing with Dittmer's reagent. The content of sphingomyelin was 95.2%.

Sphingomyelin was hydrolyzed with hydrochloric acid. The hydrolyzate was purified by silica gel column chromatography to give dihydrosphingosine at a high purity of 99%.

Dihydrosphingosine and propanal were dissolved in phosphate buffer and heated at 100° C. for one hour. The compound resulting from binding the amino group of dihydrosphingosine and the carbonyl group of propanal was confirmed by LC/MS. The product was purified by silica gel column chromatography to give the oxidation inhibitor of Example 3 (Example compound 3) at a purity of 92%.

Example 4

The mixture of 5 to 6 mg of sphingomyelin and 1.5 ml of 0.1 M tris buffer solution (pH7.4) containing 0.03 M CaCl$_2$ was treated with sonic waves for 10 sec. Phospholipase C (3 mg) derived from C. perfringens and diethylether (1.5 ml) were added. The mixture was shaken vigorously, and incubated at room temperature for three hours with shaking frequently. Ether (3 ml) was added, and the mixture was shaken, and centrifuged to separate the ether phase. The mixture was extracted again with ether (3 ml). The combined ether extract solution was washed with distilled water and centrifuged. The ether solution was concentrated to dryness under a nitrogen gas stream to remove a small amount of water to give ceramide mixture.

The ceramide mixture (4 mg) was hydrolyzed by refluxing with 2 ml of 1 M KOH/methanol at 70° C. for 18 hours. Diethylether (4 ml) and distilled water (2 ml) were then added to distribute the long chain base into the ether phase. The long chain base was collected and concentrated to dryness. The long chain base was purified by silica gel column chromatography to give dihydrosphingosine at a high purity of 99%.

Figure 4A:
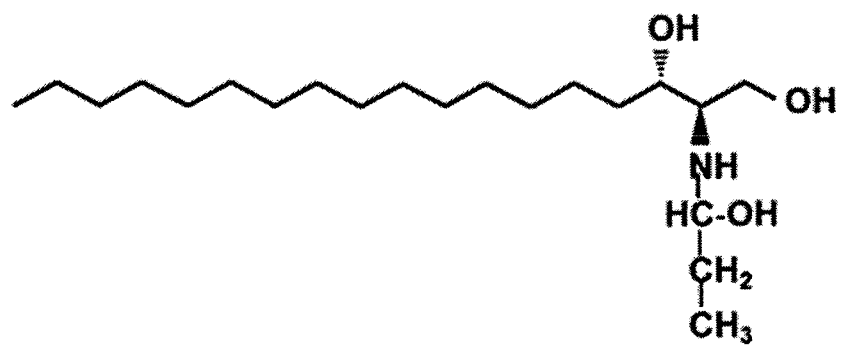
FIG. 4A illustrates a compound resulting from a covalently binding amino group of dihydrosphingoid base and carbonyl carbon of propanal and reduction of the carbonyl oxygen to hydroxyl group.
Figure 4B:
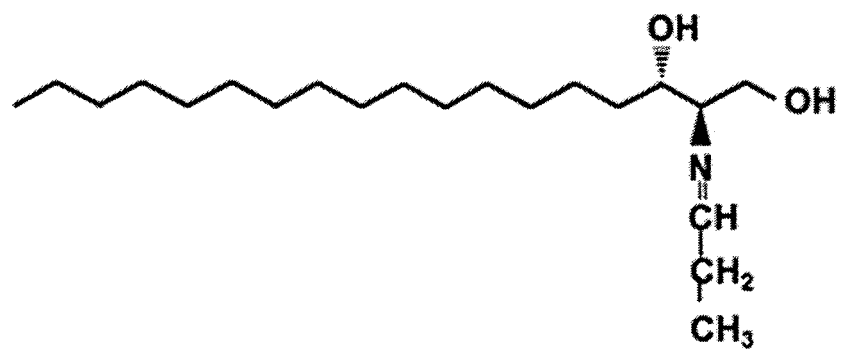
FIG. 4B illustrates a compound resulting from elimination of a hydroxyl group in the form of water from carbonyl oxygen together with hydrogen from amino group of FIG. 4A.
Figure 4C:
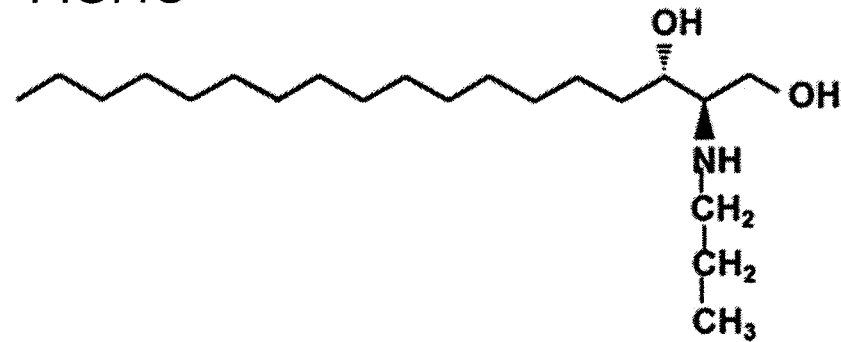
FIG. 4C illustrates a compound resulting from reduction of the double bond of FIG. 4B.

Dihydrosphingosine and propanal were dissolved in phosphate buffer and heated at 100° C. for one hour. The compound (FIG. 4A to 4C) resulting from binding the amino group of dihydrosphingosine and the carbonyl group of propanal was confirmed by LC/MS. The product was purified by silica gel column chromatography to give the oxidation inhibitor of Example 4 (Example compound 4) at a purity of 92%.

Example 5

Phytosphingosine and 2-pentanone were dissolved in phosphate buffer and heated at 100° C. for one hour. The compound resulting from binding the amino group of phytosphingosine and the carbonyl group of 2-pentanone was confirmed by LC/MS. The product was purified by silica gel column chromatography to give the oxidation inhibitor of Example 5 (Example compound 5) at a purity of 89%.

Example 6

Dihydrosphingosine and methyl octanoate were dissolved in phosphate buffer and heated at 100° C. for one hour. The compound resulting from binding the amino group of dihydrosphingosine and the carbonyl group of methyl octanoate was confirmed by LC/MS. The product was purified by silica gel column chromatography to give the oxidation inhibitor of Example 6 (Example compound 6) at a purity of 86%.

Example 7

Sphingosine and hexanoic acid were dissolved in phosphate buffer and heated at 100° C. for one hour. The compound resulting from binding the amino group of sphingosine and the carbonyl group of hexanoic acid was confirmed by LC/MS. The product was purified by silica gel column chromatography to give the oxidation inhibitor of Example 7 (Example compound 7) at a purity of 92%.

[Experiment 2]

The oxidation inhibitory effect of the oxidation inhibitors prepared in Examples 3 to 7 was evaluated by measurement of the peroxide value (POV) and organoleptic evaluation. Each of Example compounds 3 to 7 (1 mg) was mixed with marine oil TG (99 mg) for analytical use. Marine oil TG (100 mg) was also used as a comparative sample without oxidation inhibitor. Each analytical sample was weighed precisely into an analytical vial (5 ml) and capped with a butyl septum rubber and an aluminum vail seal. The samples were incubated at 40° C. in the dark for two months. The incubated samples were evaluated by measurement of peroxide value (POV) and taste evaluation by eight panelists. In the organoleptic evaluation, reversion flavor was rated, in which the reversion flavor of the marine oil TG without oxidation inhibitor (used for comparison) was assigned to score 5. A lower score represents lower reversion flavor and better taste. The results were summarized in Table 2.

TABLE 2

|  | POV (kg/meq) | organoleptic evaluation |
|---|---|---|
| marine oil | 1.5 | 5 |
| marine oil + Example compound 3 | 0.4 | 1 |
| marine oil + Example compound 4 | 0.4 | 1 |
| marine oil + Example compound 5 | 0.5 | 1 |
| marine oil + Example compound 6 | 0.5 | 1 |
| marine oil + Example compound 7 | 0.5 | 1 |

As shown in Table 2, after two months storage, POV of the marine oil TG without oxidation inhibitor was 1.5 kg/meq, and POV of the marine oil TG containing each Example compound was 0.4 or 0.5 kg/meq. The reversion flavor of the marine oil TG containing each Example compound was prevented, compared to the marine oil TG without oxidation inhibitor. From the above mentioned, addition of each Example compound as an oxidation inhibitor to marine oil TG obviously improved oxidative stability and inhibited the reversion flavor and taste reduction due to the oxidation of the unsaturated fatty acid in the marine oil.

[Experiment 3]

An effective amount of oxidation inhibitor was evaluated by the oxidative stability test as in Experiment 1 using four samples containing 0 ppt (level 1), 0.1 ppt (level 2), 0.5 ppt (level 3), and 1 ppt (level 4) of each oxidation inhibitor. The results were summarized in Table 3.

TABLE 3

|  |  | level 1 | level 2 | level 3 | level 4 |
|---|---|---|---|---|---|
| residual oxygen (%) after 100 hr | Example compound 1 | 48 | 50 | 51 | 92 |
|  | Example compound 2 | 47 | 48 | 52 | 90 |
|  | Example compound 3 | 44 | 45 | 50 | 93 |
|  | Example compound 4 | 45 | 48 | 50 | 90 |

As show in Table 3, the residual oxygen after 100 hr for levels 1 to 3 containing less than 1 ppt of Example product in the marine oil was substantially equal to that for the marine oil without oxidation inhibitor. Thus, the oxidation inhibitory effect of each Example compound was recognized in the addition of 1 ppt or more. The addition of less than 1 ppt did not show sufficient effect

[Experiment 4]

The oxidation inhibitory effect of the oxidation inhibitor prepared in Example 1 to 4 was evaluated for photodegradation of soybean oil by organoleptic evaluation. Each of Example compounds 1 to 4 (1 mg) was mixed with soybean oil (99 mg) for analytical samples. Soybean oil (100 mg) was also used as a comparative sample without oxidation inhibitor. The analytical sample was weighed precisely into an analytical vial (5 ml) and capped with a butyl septum rubber and an aluminum vial seal. The samples were incubated at 5° C. in a showcase (3500 lux) for seven days. The incubated samples were evaluated by taste evaluation by eight panelists. In the organoleptic evaluation, reversion flavor was rated with assignment to score 5 for the reversion flavor of soybean oil without inhibitor (used as the comparative). A lower score represents lower reversion flavor and better taste. The results were summarized in Table 4.

TABLE 4

|  | organoleptic evaluation |
|---|---|
| soybean oil | 5 |
| soybean oil + Example compound 1 | 1 |
| soybean oil + Example compound 2 | 1 |
| soybean oil + Example compound 3 | 1 |
| soybean oil + Example compound 4 | 1 |

As show in Table 4, reversion flavor of the soybean oil containing Example compounds 1 to 4 was more significantly prevented compared to the soybean oil without oxidation inhibitor. These results demonstrate that the addition of each of Example compounds 1 to 4 as an oxidation inhibitor to soybean oil obviously improve the oxidative stability and inhibit the reversion flavor and taste reduction due to the oxidation of the unsaturated fatty acid in the soybean oil.

INDUSTRIAL APPLICABILITY

The present invention is applicable to oxidation inhibitor. The oxidation inhibitors have high oxidation inhibitory effects, and inhibit oxidation of fats and oils, in particular, fats and oils containing a lot of polyunsaturated fatty acid to prevent deterioration resulting from oxidation of fats and oils. Furthermore, the oxidation inhibitors of the present invention are also applicable to food product components other than oxidized fats and oils.

The invention claimed is:

1. An oxidation inhibitor comprising, as an active ingredient: an aminocarbonyl compound having a structure resulting from binding of an amino group of a compound having sphingoid base structure and a carbonyl group of a carbonyl compound,
    wherein the carbonyl compound is at least one compound selected from the group consisting of propanal, propenal-acrolein, 2-hexenal, 3-hexenal, 2-pentenal, 2,4,7-decatrienal, 2-butenal, 2-butylfuran, acetaldehyde, 4,5-epoxy-2-heptanal, butanal, methyl octanoate, methyl 9-oxononanoate, 3,6-nonadienal, 2,4-heptadienal, hexanal, 2-heptenal, heptanal, nonanal, pentanal, and octanal, and
    wherein the compound having sphingoid base structure is at least one compound selected from the group consisting of sphingosine, N,N-dimethylsphingosine, phytosphingosine, 4-sphingenine, 8-sphingenine, 4-hydroxy-8-sphingenine, 4,8-sphingadienine, 9-methyl-4,8-sphingadienine, 4,8,10-sphingatrienine and 9-methyl-4,8,10-sphingatrienine.

2. An oxidation inhibitor comprising, as an active ingredient: an aminocarbonyl compound having a structure resulting from binding of an amino group of a compound having sphingoid base structure and a carbonyl group of a carbonyl compound,
    wherein the carbonyl compound is at least one compound selected from the group consisting of 2-propanone, 2-butanone, 2-pentanone, 2-hexanone, 2-heptanone, 2-octanone, 2-nonanone, and 3-octene-2-one, and
wherein the compound having sphingoid base structure is at least one compound selected from the group consisting of sphingosine, N,N-dimethylsphingosine, phytosphingosine, 4-sphingenine, 8-sphingenine, 4-hydroxy-8-sphingenine, 4,8-sphingadienine, 9-methyl-4,8-sphingadienine, 4,8,10-sphingatrienine and 9-methyl-4,8,10-sphingatrienine.

3. An oxidation inhibitor comprising, as an active ingredient: an aminocarbonyl compound having a structure resulting from binding of an amino group of a compound having sphingoid base structure and a carbonyl group of a carbonyl compound,
wherein the carbonyl compound is at least one compound selected from the group consisting of methyl 10-oxo-8-decenoate, methyl heptanoate, methyl 10-oxodecanoate, methyl nonanoate, methyl 8-oxooctanoate, methyl octanoate, methyl 9-oxo nonanoate, methyl furanoctanoate, 2,4-octadiene-2-one, methyl 13-oxo-9,11-tridecanedienoate, heptanoic acid, octanoic acid, and nonanoic acid, and
wherein the compound having sphingoid base structure is at least one compound selected from the group consisting of sphingosine, N,N-dimethylsphingosine, phytosphingosine, 4-sphingenine, 8-sphingenine, 4-hydroxy-8-sphingenine, 4,8-sphingadienine, 9-methyl-4,8-sphingadienine, 4,8,10-sphingatrienine and 9-methyl-4,8,10-sphingatrienine.

4. An oxidation inhibitor comprising, as an active ingredient: an aminocarbonyl compound having a structure resulting from binding of an amino group of a compound having sphingoid base structure and a carbonyl group of a carbonyl compound, wherein the carbonyl compound is 3-octene-2-one.

* * * * *